United States Patent
Kari

(10) Patent No.: US 6,243,579 B1
(45) Date of Patent: Jun. 5, 2001

(54) CONTROLLING OPERATING STATES OF A MOBILE STATION IN A PACKET RADIO SYSTEM

(75) Inventor: Hannu H. Kari, Veikkola (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/155,680

(22) PCT Filed: Mar. 27, 1997

(86) PCT No.: PCT/FI97/00193

§ 371 Date: Oct. 30, 1998

§ 102(e) Date: Oct. 30, 1998

(87) PCT Pub. No.: WO97/37504

PCT Pub. Date: Oct. 9, 1997

(30) Foreign Application Priority Data

Apr. 1, 1996 (FI) .......................................... 961472

(51) Int. Cl.[7] .............................. H04Q 7/20; H04B 7/216
(52) U.S. Cl. .......................... 455/426; 455/466; 370/320
(58) Field of Search ................................... 455/426, 466, 455/403, 422, 435; 370/902, 913, 311, 314, 324, 337, 347, 349–350, 352, 354, 450, 457

(56) References Cited

U.S. PATENT DOCUMENTS

| | | | |
|---|---|---|---|
| 4,697,281 | * 9/1987 | O'Sullivan | 455/556 |
| 4,731,814 | 3/1988 | Becker et al. . | |
| 5,237,603 | 8/1993 | Yamagata et al. . | |
| 5,584,048 | 12/1996 | Wieczorek . | |
| 5,640,395 | * 6/1997 | Hamalainen et al. | 370/322 |
| 5,708,656 | * 1/1998 | Noneman et al. | 370/320 |
| 5,710,975 | * 1/1998 | Bernhardt et al. | 455/38.3 |
| 5,711,008 | * 1/1998 | Gallant et al. | 455/466 |
| 5,802,465 | * 9/1998 | Hamalainen et al. | 455/403 |
| 6,009,325 | * 12/1999 | Retzer et al. | 455/434 |

FOREIGN PATENT DOCUMENTS

| | | |
|---|---|---|
| 0 601 820 | 6/1994 | (EP) . |
| 2 292 290 | 2/1996 | (GB) . |
| 2-305136 | 12/1990 | (JP) . |
| WO 91/02424 | 2/1991 | (WO) . |
| WO 95/29568 | 11/1995 | (WO) . |

OTHER PUBLICATIONS

1992, Mouly and Pautet, *The GSM System for Mobile Communications*.

A copy of the International Search Report for PCT/FI97/00193.

\* cited by examiner

*Primary Examiner*—Tracy Legree
(74) *Attorney, Agent, or Firm*—Altera Law Group, LLC

(57) ABSTRACT

In a packet radio network, a mobile station (MS) has an active state and a standby state. In the active state, the mobile station performs data transmission and updates its location more often than in the standby state. The mobile station changes from the active state to the standby state if there is no data transmission during a predetermined period. The packet radio network (SGSN) may also direct, if required, the mobile station (MS) from the active state to the standby state. The mobile station (MS) transmits to the packet radio network a short pseudo data packet either before the timer expires or in response to a command transmitted by the packet network to change the state (GO STANDBY) when the mobile station wants to stay in the active state.

17 Claims, 2 Drawing Sheets

CONTROLLING OPERATING STATES OF A MOBILE STATION IN A PACKET RADIO SYSTEM

FIELD OF THE INVENTION

The invention relates to packet radio networks and especially to controlling operating states of a mobile station in a packet radio network.

BACKGROUND OF THE INVENTION

Mobile systems have been developed due to the need to free people to move away from fixed telephone terminals without making it more difficult to reach them. While the use of different data transmission services in offices has increased, different data services have also been introduced into mobile systems. Portable computers enable efficient data processing anywhere a user happens to be. Mobile networks provide a user with an effective access network to the actual data networks for the purpose of mobile data transmission. Therefore, different new forms of data services are designed for present and future mobile networks. Mobile data transmission is particularly well supported by digital mobile systems, such as the Pan-European mobile system GSM (Global System for Mobile Communication).

General packet radio service (GPRS) is a new service in the GSM system and it is one of the subjects of the GSM standardization of phase 2+ in the ETSI (European Telecommunication Standard Institute). The GPRS operational environment consists of one or several subnetwork service areas that are interconnected by a GPRS backbone network. The subnetwork comprises a number of packet data service nodes (SN) that are referred to as servicing GPRS support nodes (SGSN) herein. Each SGSN is connected to the GSM mobile network (typically to base station systems) in such a way that it is capable of providing mobile data terminals with the packet data service via several base stations, i.e. cells. The intermediate mobile network provides packet switched data transmission between a support node and mobile data terminals. The different subnetworks are connected to an external data network, for example a packet switched public data network PSPDN, via special GPRS gateway support nodes GGSN. Therefore, packet data transmission is provided between mobile data terminals and external data networks by means of the GPRS, and the GSM network operates as an access network.

In such a GPRS network, a mobile station MS (a packet radio terminal equipment) may have different operating states: an idle state, a standby state and an active state.

In the idle state, the MS is inaccessible to the GPRS network, which does not maintain any dynamic data about the current state or location of the MS. The MS does not perform reception or transmission of data packets, either. If the MS is double-acting, i.e. it is capable of operating both in the GPRS and the GSM networks, it may be located in the GSM network while operating in the GPRS idle state. The MS may change from the idle state to the standby state by logging on to the GPRS network.

In the standby state, the MS has logged on to the GPRS network. In the GPRS network, dynamic routing and GPRS contexts have been formed for the MS. The MS and the GPRS network communicate mainly through signalling. The MS performs the selection of the GPRS routing area (RA) and the GPRS cell (cell identity, physical channel) locally. The MS informs the GPRS network when it arrives at a new RA (a few or a few dozens of cells), but it does not inform the GPRS network of a change in the GPRS channel (cell identity, physical channel). Therefore, the GPRS only knows the RA of the MS when the MS is in the standby state. The MS changes from the standby state to the active state either when the GPRS network pages the MS in the RA or when the MS starts transmitting data. The MS changes from the standby state to the idle state either when it logs out of the GPRS network or when the standby timer expires. The standby timer is used to control the time the MS remains in the standby state. The standby timer is reset and started every time the MS changes to the standby state (either from the idle or the active state).

In the active state, the GPRS network also knows the GPRS channel the MS has selected, in addition to the RA of the MS. The MS updates its new GPRS channel to the GPRS network when the channel is changed as a result of local cell (re)selection. The MS transmits and receives data packets in this state. The MS may remain in the active state even when no data is transmitted. In the downlink direction (from the network to the MS), the MS may receive either continuously (CRX) or discontinuously (DRX). The active timer is used to control the time the MS remains in the active state after a data packet has been successfully moved between the MS and the GPRS network. The MS changes from the active state to the standby state when the active timer expires. In order to change from the active state to the idle state, the MS starts the logoff out of the network.

The standby timer and the active timer are maintained both in the MS and in the GPRS network to control the time the MS stays in the standby state or in the active state, respectively. These timers are usually set for the same period of time both in the MS and in the GPRS network. Normally the timers have a certain default value that the GPRS network may change dynamically by transmitting a new value to the MS. If the new value is zero, it immediately forces the MS to enter from the active state to the standby state or, correspondingly, from the standby state to the idle state. The MS may also ask the GPRS network to lengthen the time of the timer and the GPRS network may either accept or reject this request.

The aim is to minimize, by means of these different states, the loading caused by the less active mobile stations on the GPRS network, but on the other hand, to maintain the network throughput and speed as good as possible for data transmission. Further, the different states can be used to decrease the power consumption of the MSs.

For example in the active state, the MS updates its location in connection with each cell crossover (handover), which means an increased signalling load and power consumption of the MS. Therefore, it is preferable to make an MS that does not actively transmit data packets to change to the standby state, as it is currently performed with the active timer. In the standby state, the MS updates its location only when it changes the RA, which means a lower signalling load and power consumption. In the standby state, the MS may also use discontinuous reception DRX, which further decreases the consumption of power. On the other hand, data transmission to an MS first requires that the MS is paged, which slows down the start-up of data transmission. In the idle state there is no regular signalling.

The problem detected by the Applicant is related to the fact that controlling operating states of an MS with timers is not an optimal solution, but there is still rather a lot of unnecessary signalling and resulting power consumption of an MS in the GPRS network. For example, the time of the active timer could be typically one minute or a few minutes. After it has transmitted the last data packet, the MS is in the active state for the aforementioned time even if it had no more data to transmit or receive. During this period, in the worst case there may still be several cell crossovers before the active timer expires, thus moving the MS to the standby state. Assume, for example, that a packet radio system is used for collecting a road toll. When a car has passed the toll booth and paid the toll via the GPRS system, it can pass several base stations before the active timer expires.

Another problem is related to a situation where an MS wants to stay in the active state in order to maintain a high quality of service (QoS) in case it might transmit or receive data in the near future. For this purpose, the MS may request for an extension of the time of the active timer. If the GPRS network rejects the request, the MS is forced to change to the standby state against its will.

SUMMARY OF THE INVENTION

The object of the present invention is to control the states of a mobile station so that the aforementioned problems are alleviated or avoided.

The invention relates to a packet radio system comprising a packet radio network and a mobile station having a first state and a second state, the mobile station carrying out data transmission and updating its location more often in the first state than in the second state, the mobile station being arranged to change from the first state to the second state, if there is no data transmission during a predetermined period. The system is characterized according to the invention in that the packet radio network is arranged, if required, to command the mobile station from the first state to the second state, the mobile station is arranged to transmit a short pseudo data packet to the packet radio network either before the end of said predetermined period or in response to said command when the mobile station wants to stay in the first state.

The invention also relates to a packet radio system which is characterized in that the packet radio network is arranged to command the mobile station from the first state to the second state with a first signalling message immediately after the transmission of the last data packet when the mobile station assumes that it has no data to transmit for a while, the mobile station is arranged to inform the packet radio network with another signalling message after the transmission of the last data packet that it changes immediately from the first state to the second state when the mobile station assumes that it has no more data to transmit for a while.

The invention further relates to a packet radio system which is characterized in that the packet radio network is arranged to immediately command the mobile station from the first state to the second state with the control data contained in the last data packet when the packet radio network assumes that it has no more data to transmit for a while, the mobile station is arranged to inform the packet radio network with the control data contained in the last data packet that it changes immediately from the first state to the second state when the mobile station assumes that it has no more data to transmit for a while.

In the invention, a mobile station is arranged to transmit data to the packet radio network, indicating that it wants to change immediately from the (first) active state to the (second) standby state before the timer controlling the active state expires, since the mobile station has no more data to transmit or it does not expect to receive data in the near future. Correspondingly, the packet network is arranged to transmit control data to the mobile station, indicating that the mobile station should change immediately from the active state to the standby state, since the packet radio network has no more data to transmit or it does not expect to receive data in the near future. By means of this control data, the mobile station may immediately change to the standby state in order to avoid additional location updating signalling or power consumption that might occur during the period between the last data packet and the expiration of the timer.

The control data can be transmitted in a special message after the last transmitted or received data packet. However, this produces additional signalling at the air interface and extra power consumption. In a second embodiment of the invention, a normal data packet is supplemented with an information field indicating that the data packet in question is the last packet for the time being and that the mobile station is about to enter the standby state or that it should change to the standby state. The information field can consist of one bit having two states one of which (e.g. 1) indicates that the data packet is the last one. This embodiment minimizes extra signalling and it saves power the most. It is also easy to realize in practice.

Another embodiment of the invention solves the problem that the mobile station wants to stay in the active state even though the packet radio network has transmitted a command to change to the standby state or the timer for the active state is about to expire and the packet radio network has rejected the request for extending the time of the timer. According to the invention, the mobile station transmits to the packet radio network a short pseudo data packet containing the mobile station identity and only a few or no data bytes. When the packet radio network receives this pseudo data packet where the packet data contents or size are zero, it interprets the packet to be faulty (invalid) and does not forward it. However, transmission of a pseudo data packet resets and reactivates the timer both in the mobile station and in the packet radio network. In this manner, the mobile station can stay in the active state as long as it wants. The pseudo data packet may contain information by means of which the packet radio network may identify a pseudo data packet. In this manner, the network operator may charge the user for the extra time it stays in the active state, if desired.

BRIEF DESCRIPTION OF THE DRAWINGS

In the following, the invention will be described by means of the preferred embodiments and with reference to the accompanying drawing, in which.

DETAILED DESCRIPTION OF THE INVENTION

The present invention can be used for controlling operating states of a mobile station in different types of packet radio systems wherein the mobile station may be in the active state and in the standby state where the need for signalling and/or the power consumption of the mobile station are smaller than in the active state. It should be noted that other terms may be used for states substantially similar to the active state and the standby state described herein. The invention is particularly well applicable for implementing the general packet radio service (GPRS) in the Pan-European digital mobile system GSM (Global System for Mobile Communication) or in corresponding mobile systems, such as the DCS1800 and the PCN (Personal Communication Network). In the following, the preferred embodiments of the invention will be described by means of a GPRS packet radio network formed together by the GPRS and the GSM system, without restricting the invention to such a specified packet radio system, however. Also in the GPRS, since the standardization process is still unfinished, the terminology used may change. For example, the active state may be called the ready state.

Figure 1:
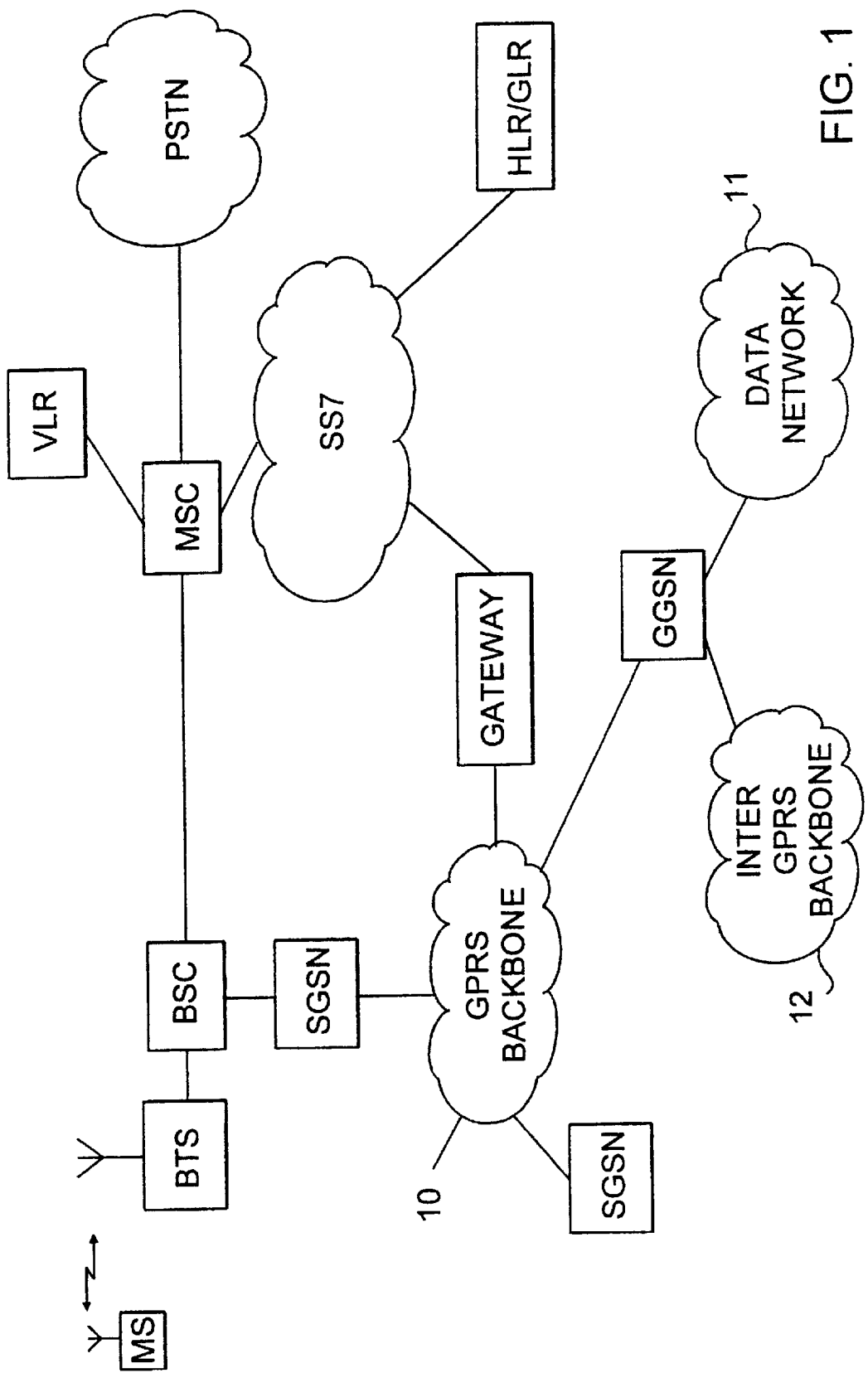
FIG. 1 shows a GPRS network according to the invention.

FIG. 1 illustrates a GPRS packet radio network implemented in the GSM system.

The basic structure of the GSM network consists of two parts: a base station system BSS and a network subsystem NSS. The BSS and the MSs communicate via radio connections. In the BSS, each cell is served by a base station BTS. A number of BTSs are connected to a base station controller BSC. The function of the BSC is to control radio frequencies and channels that the BTS uses. The BSCs are connected to a mobile services switching centre MSC. Certain MSCs are connected to other telecommunication networks, such as the public switched telephone network PSTN, and they comprise gateway functions for calls terminating at and originating from these networks. These MSCs are known as gateway MSCs (GMSC). The GSM network also comprises two databases: a home location register HLR and a visitor location register VLR. The implementation of the GSM system is not relevant to the invention, however. For a more detailed description of the GSM system, reference is made to the ETSI/GSM recommendations and to *The GSM System for Mobile Communications* by M. Mouly and M. Pautet (Palaiseau, France, 1992), ISBN:2-9507190-07-7.

In FIG. 1, a GPRS network connected to a GSM network comprises two servicing GPRS support nodes (SGSN) and one GPRS gateway support node (GGSN). These different support nodes SGSN and GGSN are interconnected by an intra-operator backbone network. It should be understood that a GPRS network may comprise any number of support and gateway nodes.

Each SGSN controls the packet data service in the area of one or several cells in a cellular-type packet radio network. For this purpose, each SGSN is connected to a certain local part of the GSM mobile system. This connection is typically made to the MSC, but in some cases it might be preferable to make the connection directly to a BSS, i.e. to a BSC or to a BTS. An MS situated in a cell communicates over the radio interface with the BTS and further via the mobile network with the SGSN to the service area of which the cell belongs. In principle, the intermediate mobile network between the SGSN and the MS only transmits data packets via either a circuit switched or a packet switched connection between the MS and the SGSN, and the exact operation and structure of the network are not essential to the invention.

The intra-operator backbone network 10 that interconnects the devices SGSN and GGSN of the operator may be realized for example by means of a local network.

The GGSN interconnects the GPRS network of the operator to the GPRS systems and data networks of other operators, such as an inter-operator backbone network 12, an IP network or an X.25 network 11.

The GGSN is also used to store the location information of GPRS mobile stations. The GGSN also routes mobile-terminating (MT) data packets. The GGSN also comprises a database which maps together the network address of the mobile station for example in the IP network, the X.25 network, the CLNP network or simultaneously in several of these networks, and the identity of the MS in the GPRS network. When the MS travels from one cell to another within the area of one SGSN, the location updating should only be carried out in the SGSN and there is no need to inform the GGSN about the change of location. When the MS moves from a cell of one SGSN to a cell of another SGSN within the area of the same or a different operator, the routing data is also updated to the (home) GGSN. The routing data comprises the address of the new SGSN and the MS identity in this SGSN.

The GPRS register GR is used for subscriber authentication at the beginning of a GPRS session. It contains the mapping between the subscriber packet data protocol (PDP) address(es) and the subscriber IMSI (International Mobile Subscriber Identity). The GR lists the data network protocols and the addresses thereof that each mobile subscriber (identified by means of the IMSI) is allowed to use. It is also possible that the functions of the GR are integrated into the GGSN.

As described above, a GPRS mobile station may have different states or GPRS context states. These include idle, standby and active states.

In the idle state, the MS does not have a GPRS context (dynamic GPRS information related to the current state of the MS) either in the MS or in the SGSN. The idle state is not relevant to the invention.

When the MS has logged on to the GPRS network and started using (one or more) user network protocols, the MS may be either in the standby or the active state. The MS may be in the standby or the active state even though it did not use any user protocol yet. (In such a case, only one SGSN is aware of the MS. A GGSN only obtains information concerning the MS when a user protocol is used.)

In the standby state, the MS has logged on to the SGSN. The SGSN and the GGSN have formed a dynamic routing context. The SGSN has formed the GPRS context among other things. The GPRS context comprises the routing information and the scanning keys. The MS performs the selection of the GPRS routing area and the GPRS cell (cell identity, physical channel) locally. The MS informs the GPRS network when it arrives at a new RA (a few or a few dozens of cells), but it does not inform the SGSN about the change in the GPRS channel (cell identity, physical channel). Therefore, the GPRS network only knows the RA of the MS when the MS is in the standby state.

In the active state, the SGSN knows the GPRS channel that the MS has selected, in addition to the RA and the GGSN of the MS. The MS updates its new GPRS channel to the GPRS network when the channel is changed as a result of the local cell (re)selection. The MS may transmit and receive data packets in this state.

These states are controlled conventionally with standby and active timers, but there are problems related to this method, as described above.

The first problem was that the MS stays in the active state after the last packet until the active timer expires even though the MS or the SGSN did not have any data to transmit. The time of the active timer may typically be one or several minutes. The MS may perform several crossovers during this time, requiring signalling to the network. This increases the power consumption of the MS and increases the signalling load in the network.

Figure 2:
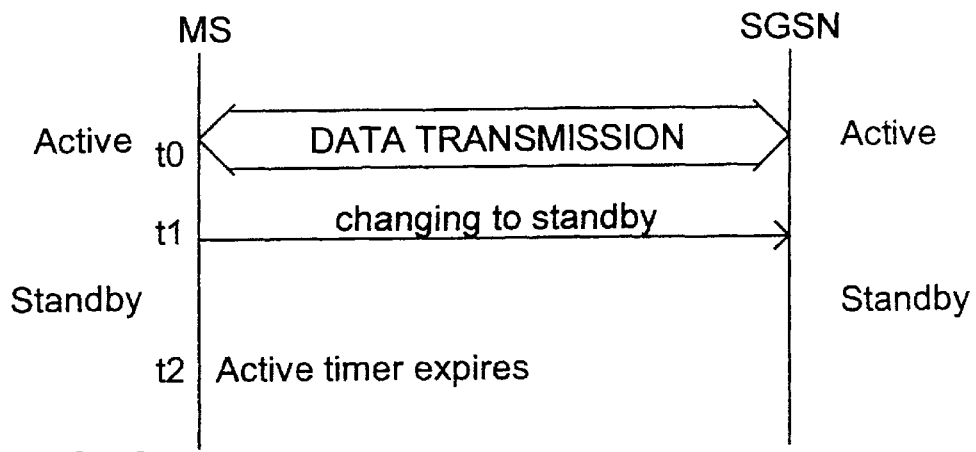
FIGS. 2 and 3 are signalling charts illustrating the signalling according to the invention by means of which an MS is immediately changed to the standby state.

FIG. 2 shows an embodiment of the invention which solves this problem. In the signalling chart of FIG. 2, the data transmission between the MS and the SGSN is in the active state. The data transmission is terminated at a moment t0 when the active timer is reset and reactivated. The MS states that it will not transmit any more data and it assumes that it will receive no data, at least for a while. The MS transmits (at a moment t1) to the SGSN a message "changing to standby" indicating that it wants to change immediately from the active state to the standby state before the active timer expires at a moment t2. The MS changes from the active state to the standby state after it has transmitted the "changing to standby" message at the moment t1. The SGSN also changes the GPRS context of the MS from the active state to the standby state (at approximately the moment t1) as it receives the "changing to standby" message from the MS. In this manner, it is possible to avoid unnecessary signalling and power consumption that might occur if the MS remained in the active state until the active timer expires (the moment t2).

Figure 3:
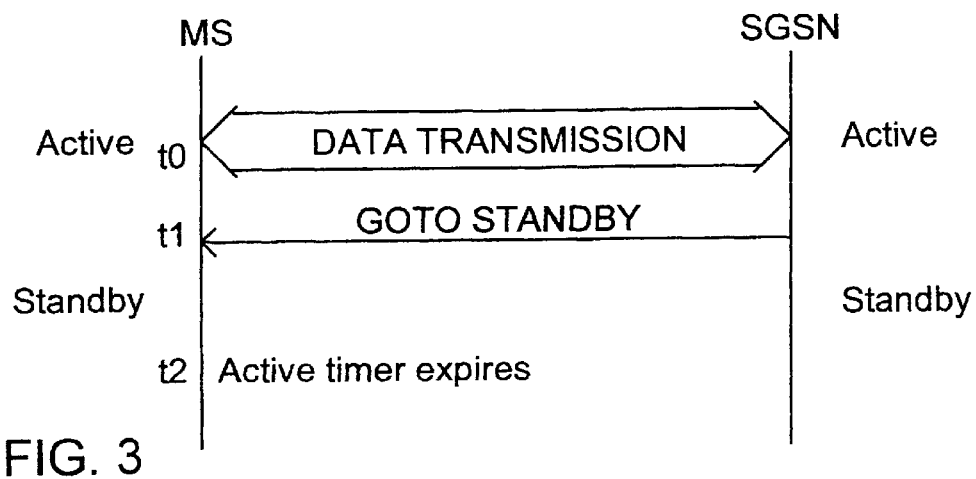

FIG. 3 shows another embodiment of the invention, wherein the SGSN transmits to the MS a message "go to standby" (at a moment t1) which commands the MS to immediately change from the active state to the standby state before the active timer expires at a moment t2, since the SGSN has no more data to transmit or it does not expect to receive any more data. The SGSN changes the GPRS context from the active state to the standby state after it has transmitted the "go to standby" message at the moment t1 or after a small delay. This delay enables a response of the MS, as will be described below. The MS also changes to the standby state when it receives the "go to standby" message from the SGSN.

The use of a separate message causes additional signalling at the air interface, however. In yet another embodiment of the invention, no dedicated messages are used. Instead, a normal data packet is provided with an information field that indicates to the SGSN that the MS is about to change to the standby state, or that informs the MS that the SGSN commands it to change to the standby state, or that it should enter into the standby state. The information field may be one bit having two states one of which (e.g. 1) indicates a change to the standby state. When the MS transmits or receives a data packet where the state of the aforementioned information field is 1, it changes to the standby state and the SGSN changes the GPRS context to the standby state.

Another problem is that the SGSN may force the MS from the active state to the standby state in the aforementioned manner or, for example, by rejecting the request transmitted by the MS to lengthen the time of the active timer, or in some other manner, even though the MS wanted to stay in the active state, for example for the sake of better quality of service QoS.

Figure 4:
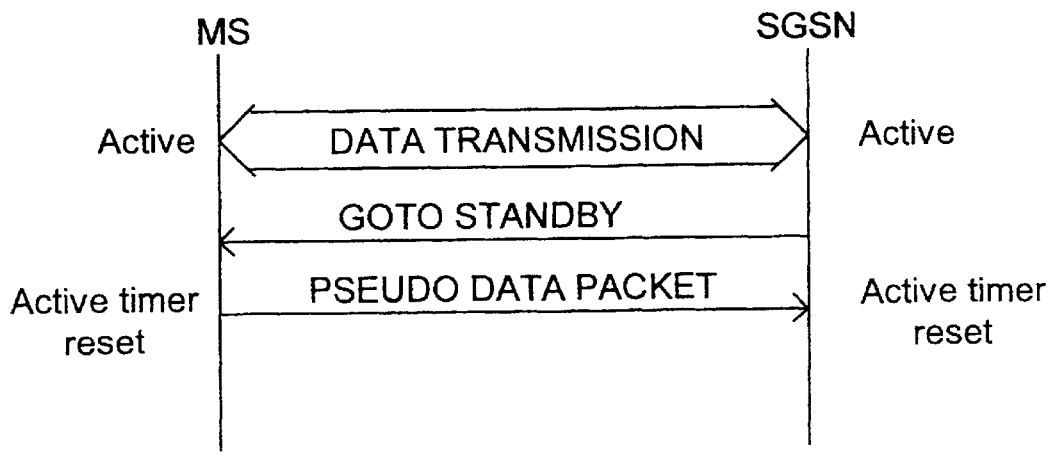
FIG. 4 is a signalling chart illustrating the transmission of a pseudo data packet in order to maintain an MS in the active state.

FIG. 4 shows yet another embodiment of the invention alleviating the above-described problem. The signalling chart of FIG. 4 proceeds in the same manner as FIG. 3 until the MS receives the "go to standby" message. The MS wants to operate contrary to the control message and stay in the active state. Therefore, the MS transmits to the SGSN a short "pseudo data packet". The pseudo data packet contains the MS identity and a few or no data bytes. Transmission of a pseudo data packet resets and reactivates the active timer so that the MS remains in the active state. When the SGSN receives this pseudo data packet, it interprets that the packet is faulty (invalid) and does not forward it. Alternatively, the SGSN may transmit a pseudo data packet to the GGSN, which either transmits the packet to the data network (e.g. a ping packet in the IP network) or rejects its. However, this is not relevant to the invention. The only feature essential to the invention is that as a result of the transmission of a pseudo data packet, the SGSN resets and reactivates the active timer, whereupon the SGSN maintains the GPRS concept in the active state. The transmission of a pseudo data packet can be repeated whenever required, so that the MS remains continuously in the active state. In this manner, a mobile station may stay in the active state as long as it wants.

A pseudo data packet may comprise information by means of which the packet radio network can identify the pseudo data packet. In this manner, the network operator may charge, if desired, the user for the extra time it stays in the active state.

The figures and the description related thereto are only intended to illustrate the present invention. The details of the invention may vary within the scope and spirit of the appended claims.

What is claimed is:

1. A packet radio system comprising:

a packet radio network, and a mobile station having a first state and a second state, the mobile station carrying out data transmission and updating its location more often in the first state than in the second state, the mobile station being arranged to change from the first state to the second state, if there is no data transmission during a predetermined period, said mobile station comprising a first timer that controls the time the mobile station stays in the first state after the transmission or reception of a data packet, wherein, in response to the expiration of the first timer, the mobile station independently changes from the first state to the second state, the packet radio network comprising a second timer that controls the time the first state is maintained as the status of the mobile station in the packet radio network after the transmission or reception of a data packet, wherein, in response to the expiration of the second timer, the packet radio network changes the status of the mobile station from the first state to the second state when the time of said second timer is approximately the same as the time of said first timer, the packet radio network being arranged, if required, to command the mobile station from the first state to the second state, the mobile station being arranged to transmit a short pseudo data packet to the packet radio network either before the end of said predetermined period or in response to said command when the mobile station wants to stay in the first state, whereupon the first and second timers are reset and reactivated in response to the transmission and reception, respectively, of the pseudo data packet.

2. A packet radio system according to claim 1, wherein said pseudo data packet contains the mobile station identity and little or no data.

3. A packet radio system comprising:

a packet radio network, and a mobile station having a first state and a second state, the mobile station carrying out data transmission and updating its location more often in the first state than in the second state, the mobile station being arranged to change from the first state to the second state, if there is no data transmission during a predetermined period, the mobile station comprising a first timer that controls the time the mobile station stays in the first state after the transmission or reception of a data packet, wherein, in response to the expiration of the first timer, the mobile station independently changes from the first state to the second state, the packet radio network comprising a second timer that controls the time the first state is maintained as the status of the mobile station in the packet radio network after the transmission or reception of a data packet, wherein, in response to the expiration of the second timer, the packet radio network changes the status of the mobile station from the first state to the second state when the time of said second timer is approximately the same as the time of said first timer, the packet radio network being arranged to maintain data about the current packet radio cell and packet radio channel of the mobile station when the mobile station is in the first state, the packet radio network being arranged to maintain data about the current routing area of the mobile station, which comprises one or several cells, when the mobile station is in the second state, the mobile station being arranged to update the packet radio cell and packet radio channel data to the packet radio network whenever it changes the cell or the channel in the first state, the mobile station being arranged to update the routing area data to the packet radio network whenever it arrives at a new routing area in the second state, the packet radio network being arranged, if required, to command the mobile station from the first state to the second state, the mobile station being arranged to transmit a short pseudo data packet to the packet radio network before said timers expire or in response to said command when the mobile station wants to remain in the first state, whereupon the first and second timers are reset and reactivated in response to the transmission and reception, respectively, of the pseudo data packet.

4. A packet radio system according to claim 3, wherein said pseudo data packet contains the mobile station identity and little or no data.

5. A packet radio system comprising:

a packet radio network, and a mobile station having a first state and a second state, the mobile station performing data transmission and updating its location more often in the first state than in the second state, the mobile station being arranged to change from the first state to the second state, if there is no data transmission during a predetermined period, the mobile station comprising a first timer that controls the time the mobile station stays in the first state after the transmission or reception of a data packet, wherein, in response to the expiration of the first timer, the mobile station independently changes from the first state to the second state, the packet radio network comprising a second timer that controls the time the first state is maintained as the status of the mobile station in the packet radio network after the transmission or reception of a data packet, wherein, in response to the expiration of the second timer, the packet radio network changes the status of the mobile station from the first state to the second state when the time of said second timer is approximately the same as the time of said first timer, the packet radio network being arranged to command the mobile station from the first state to the second state with a first signalling message immediately after the transmission of the last data packet when the mobile station assumes that it has no data to transmit for a while, the mobile station being arranged to inform the packet radio network with another signalling message after the transmission of the last data packet that it changes immediately from the first state to the second state when the mobile station assumes that it has no more data to transmit for a while, whereupon the first and second timers are reset and reactivated in response to the transmission and reception, respectively, of the pseudo data packet.

6. A packet radio system comprising:

a packet radio network, and a mobile station having a first state and a second state, the mobile station carrying out data transmission and updating its location more often in the first state than in the second state, the mobile station being arranged to change from the first state to the second state, if there is no data transmission during a predetermined period, the mobile station comprising a first timer controlling the time the mobile station remains in the first state after the transmission or reception of a data packet, wherein, in response to the expiration of the first timer, the mobile station independently changes from the first state to the second state, the packet radio network comprising a second timer controlling the time the first state is maintained as the status of the mobile station in the packet radio network after the transmission or reception of a data packet, wherein, in response to the expiration of the second timer, the packet radio network changes the status of the mobile station from the first state to the second state when the time of said second timer is approximately the same as that of said first timer, the packet radio network being arranged to maintain data about the current packet radio cell and packet radio channel of the mobile station when the mobile station is in the first state, the packet radio network being arranged to maintain data about the current routing area of the mobile station, which comprises one or several cells, when the mobile station is in the second state, the mobile station being arranged to update the packet radio cell and packet radio channel data to the packet radio network whenever the mobile station changes the cell or the channel in the first state, the mobile station being arranged to update the routing area data to the packet radio network whenever it arrives at a new routing area in the second state, the mobile station being arranged to transmit a short pseudo data packet to the packet radio network in response to said first signalling message when the mobile station wants to stay in the first state, whereupon the first and second timers are reset and reactivated in response to the transmission and reception, respectively, of the pseudo data packet.

7. A packet radio system according to claim 6, wherein:

in response to the reception of the first signalling message, the mobile station changes from the first state to the second state, and in response to the transmission of the first signalling message, the packet radio network changes the status of the mobile station from the first state to the second state.

8. A packet radio system according to claim 7, wherein in response to the transmission of the second signalling message, the mobile station changes from the first state to the second state, and in response to the reception of the second signalling message, the packet radio network changes the status of the mobile station from the first state to the second state.

9. A packet radio system according to claim 6, wherein:
in response to the transmission of the second signalling message, the mobile station changes from the first state to the second state, and
in response to the reception of the second signalling message, the packet radio network changes the status of the mobile station from the first state to the second state.

10. A packet radio system according to claim 5, wherein:
in response to the reception of the first signalling message, the mobile station changes from the first state to the second state, and
in response to the transmission of the first signalling message, the packet radio network changes the status of the mobile station from the first state to the second state.

11. A packet radio system according to claim 10, wherein:
in response to the transmission of the second signalling message, the mobile station changes from the first state to the second state, and
in response to the reception of the second signalling message, the packet radio network changes the status of the mobile station from the first state to the second state.

12. A packet radio system according to claim 5, wherein:
in response to the transmission of the second signalling message, the mobile station changes from the first state to the second state, and
in response to the reception of the second signalling message, the packet radio network changes the status of the mobile station from the first state to the second state.

13. A packet radio system comprising:
a packet radio network, and
a mobile station having a first state and a second state, the mobile station performing data transmission and updating its location more often in the first state than in the second state, the mobile station being arranged to change from the first state to the second state, if there is no data transmission during a predetermined period,
the mobile station comprising a first timer that controls the time the mobile station stays in the first state after the transmission or reception of a data packet, wherein, in response to the expiration of the first timer, the mobile station independently changes from the first state to the second state,
the packet radio network comprising a second timer that controls the time the first state is maintained as the status of the mobile station in the packet radio network after the transmission or reception of a data packet, wherein, in response to the expiration of the second timer, the packet radio network changes the status of the mobile station from the first state to the second state when the time of said second timer is approximately the same as the time of said first timer,
the packet radio network being arranged to immediately command the mobile station from the first state to the second state with the control data contained in the last data packet when the packet radio network assumes that it has no more data to transmit for a while,
the mobile station being arranged to inform the packet radio network with the control data contained in the last data packet that it changes immediately from the first state to the second state when the mobile station assumes that it has no more data to transmit for a while, whereupon the first and second timers are reset and reactivated in response to the transmission and reception, respectively, of the pseudo data packet.

14. A packet radio system according to claim 13, wherein:
in response to the transmission or reception of said control data, the mobile station changes from the first state to the second state, and
in response to the transmission or reception of said control data, the packet radio network changes the status of the mobile station from the first state to the second state.

15. A packet radio system according to claim 13, wherein the data packet contains a dedicated information field wherein said control data is transmitted.

16. A packet radio system comprising:
a packet radio network, and
a mobile station having a first state and a second state, the mobile station carrying out data transmission and updating its location more often in the first state than in the second state, the mobile station being arranged to change from the first state to the second state, if there is no data transmission during a predetermined period,
the mobile station comprising a first timer controlling the time the mobile station remains in the first state after the transmission or reception of a data packet, wherein, in response to the expiration of the first timer, the mobile station independently changes from the first state to the second state,
the packet radio network comprising a second timer controlling the time the first state is maintained as the status of the mobile station in the packet radio network after the transmission or reception of a data packet, wherein, in response to the expiration of the second timer, the packet radio network changes the status of the mobile station from the first state to the second state when the time of said second timer is approximately the same as that of said first timer,
the packet radio network being arranged to maintain data about the current packet radio cell and packet radio channel of the mobile station when the mobile station is in the first state,
the packet radio network being arranged to maintain data about the current routing area of the mobile station, which comprises one or several cells, when the mobile station is in the second state,
the mobile station being arranged to update the packet radio cell and packet radio channel data to the packet radio network whenever the mobile station changes the cell or the channel in the first state,
the mobile station being arranged to update the routing area data to the packet radio network whenever it arrives at a new routing area in the second state,
the mobile station being arranged to transmit a short pseudo data packet to the packet radio network in response to the reception of said control data when the mobile station wants to stay in the first state, whereupon the first and second timers are reset and reactivated in response to the transmission and reception, respectively, of the pseudo data packet.

17. A packet radio system according to claim 16, wherein
in response to the transmission or reception of said control data, the mobile station changes from the first state to the second state, and
in response to the transmission or reception of said control data, the packet radio network changes the status of the mobile station from the first state to the second state.

* * * * *